US007997980B2

(12) United States Patent
Luciano et al.

(10) Patent No.: US 7,997,980 B2
(45) **Date of Patent: *Aug. 16, 2011**

(54) VOUCHER GAMING SYSTEM

(75) Inventors: Robert A. Luciano, Reno, NV (US); Warren White, Reno, NV (US)

(73) Assignee: Bally Gaming, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 12/897,657

(22) Filed: Oct. 4, 2010

(65) Prior Publication Data

US 2011/0021265 A1 Jan. 27, 2011

Related U.S. Application Data

(63) Continuation of application No. 10/750,275, filed on Dec. 30, 2003, now Pat. No. 7,806,766.

(51) Int. Cl.
*A63F 9/24* (2006.01)
*A63F 13/00* (2006.01)

(52) U.S. Cl. ................ 463/25; 463/16; 463/20; 463/29; 463/42

(58) Field of Classification Search .............. 463/16–20, 463/25–29, 40–42; 273/138.1–2, 143 R
See application file for complete search history.

(56) References Cited

U.S. PATENT DOCUMENTS 5,277,424 A * 1/1994 Wilms ............................ 463/12
5,690,335 A * 11/1997 Skratulia ....................... 273/292
5,903,880 A * 5/1999 Biffar .............................. 705/39
6,012,983 A * 1/2000 Walker et al. ................... 463/20
6,068,552 A * 5/2000 Walker et al. ................... 463/21
6,113,492 A * 9/2000 Walker et al. ................... 463/16
6,165,071 A * 12/2000 Weiss .............................. 463/24
6,267,670 B1 * 7/2001 Walker et al. ................... 463/17
6,280,326 B1 * 8/2001 Saunders ........................ 463/25
6,296,569 B1 * 10/2001 Congello, Jr. ................... 463/17
6,500,067 B1 * 12/2002 Luciano et al. ................. 463/25
6,623,357 B2 * 9/2003 Chowdhury .................... 463/25
6,682,421 B1 * 1/2004 Rowe et al. ..................... 463/25
6,685,559 B2 * 2/2004 Luciano et al. ................. 463/16
6,702,671 B2 * 3/2004 Tarantino ........................ 463/20
6,702,673 B2 * 3/2004 Webb .............................. 463/25
6,824,464 B2 * 11/2004 Weil et al. ....................... 463/17
7,241,221 B1 * 7/2007 Luciano et al. ................. 463/20
7,798,898 B2 * 9/2010 Luciano et al. ................. 463/25
7,806,766 B1 * 10/2010 Luciano et al. ................. 463/25

* cited by examiner

*Primary Examiner* — Dmitry Suhol
*Assistant Examiner* — Ryan Hsu
(74) *Attorney, Agent, or Firm* — David N. Caracappa

(57) ABSTRACT

A gaming system and method of playing a gaming device by a user. The method includes inserting a voucher having a voucher value into the gaming device and accessing a database having voucher data associated with the voucher. The voucher value is verified. The user is queried for a credit value of a base wagering denomination. Calculations of full game credits and partial game credits are performed based upon the voucher value and the credit value. The full game credits, the partial game credits, and the voucher value are displayed on a game display. The method allows partial or all credits to be played at any time. The method provides for recording of game events to a database. The method also allows for the user to change the base wagering denomination during game play.

14 Claims, 8 Drawing Sheets

VOUCHER GAMING SYSTEM

CROSS REFERENCE TO RELATED APPLICATIONS

This application is a continuation of U.S. patent application Ser. No. 09/784,237, filed on Feb. 14, 2001.

BACKGROUND OF THE INVENTION

1. Field of Invention

This invention relates to gaming a system that is adapted to use vouchers or other information carrying devices instead of cash. In particular, the invention relates to a system that allows a player to determine the value or denomination of a credit upon which a game is played.

2. Description of Related Art

Gaming devices often express wagers and prizes in terms of credits. A credit has a fixed value that is generally one of a plurality of standard currency denominations, such as coins of a given currency ($0.05, $0.10, $0.25, and $1.00).

However, different players prefer different denominations. Some players prefer to play with a low denomination while other players prefer to play with a high denomination. In order to accommodate different players, gaming device operators must provide a variety of gaming devices that are adapted to operate with different credit denominations. In the case of coin operated gaming devices, operating a variety of gaming devices increases the cost of operating the devices because of the lack of standard parts and standard maintenance and repair procedures.

Additional problems are encountered when gaming devices are adapted to utilize vouchers. A voucher is a portable ticket, coupon, memory storage device, or other instrument that is adapted to carry information. The information may be used to derive monetary value or credits. A voucher may allow a player to access credits stored in a player account in order to withdraw credits to play a game. A voucher may also allow a player to move credits from one gaming device to another.

One of the problems associated with voucher operated gaming devices that operate in different denominations is residual value. For example, a voucher cash-out ticket from a "Quarter Machine" may have a value of $19.50. This voucher ticket would be considered non-standard when presented to a "Dollar Machine" which offers play at a $1.00 credit denomination. Prior art voucher/credit devices and systems generally manage non-standard denominations by designating and maintaining an unusable portion of the players funds in a bank that is "unusable" for play and normally not visible during game play.

The "usable" portion is credited for use with game play and is indicated on the game's credit meter. The "unusable" portion is then credited back to the player upon cash-out by the player, or in some cases, the "unusable" portion is provided back to the player in the form of a "change voucher" immediately upon presentation of the non-standard denominational voucher or currency. In yet other cases, the non-standard denomination amount is simply rejected when, for example, a player inserts $0.25 into a "Dollar Machine."

Another situation where the problem of differing or non-standard denominations arises is when a gaming machine is equipped to accept and validate currency from various local and/or foreign countries. Often in this case, the exchange rate does not easily map the provided currency into the denomination for which game play is provided. From a local currency standpoint, for example, nickels, dimes and quarters are not generally usable for play on "Dollar Machines". This problem is magnified when applied to converting foreign currency at varying exchange rates.

Prior art gaming systems that allow voucher transferability from disparate denomination gaming machines have several shortcomings. First, as noted above, the "unusable" portion remains unplayable on the gaming device, thereby inherently limiting the playability and appeal of the gaming machine. Second, prior art gaming systems generally convert player credits to the lowest common denominator, such as $0.01. Therefore, play on a "Dollar Machine" would simply convert to 100 credits of $0.01 value for each dollar wagered. Under this arrangement, generating statistical and accounting data becomes problematic because the machine participating may be viewed as a $0.01 machine. The determination of the success and popularity of differing denomination machines becomes extremely burdensome without any record of each machines transactions.

The implementation of "variable-denomination" gaming machines has recently increased in popularity. Variable denomination gaming machines generally provide game play according to a predetermined fixed set of denominations, for example, $0.05, $0.10, $0.25. Under this arrangement, the player may place wagers according to the fixed set of denominations. The player may decide to place $0.05 wagers, $0.10 wagers, or $0.25 wagers at various times, thereby allowing the player to better manage the player's credit bank. While providing some flexibility in placing wagers, the player is still limited to the predetermined and fixed set of denominations.

What has long been needed is a more flexible game system that allows a player to define a wager denomination for a game, rather than requiring a player to choose from a fixed denomination. Another long felt need is for a gaming device that displays full and partial player credits that are available for the player to play. Another long felt need is for a gaming device that tracks and records game information in wagered denominations.

SUMMARY OF INVENTION

1. Advantages of the Invention

An advantage of the present invention is that it provides a gaming system and method that allows a user to play full and/or partial game credits.

Another advantage of the present invention is that it provides a gaming system and method that allows a user to determine the value of a credit.

A further advantage of the present invention is that it provides a gaming system and method that displays full and partial game credits.

An additional advantage of the present invention is that it provides a gaming system and method that records game events in a database in terms of full credits, partial credits, and voucher value.

Yet another advantage of the present invention is that it provides a gaming system and method that eliminates the need for change vouchers for non-standard wagering denominations.

Another advantage of the present invention is that it allows gaming operators and/or players to select from a broader array of wagering amounts, providing increased interest and player enjoyment.

Another advantage of the present invention is that it allows any gaming device to operate with any credit value.

These and other advantages of the present invention may be realized by reference to the remaining portions of the specification, claims, and abstract.

2. Brief Description of the Invention

The present invention comprises a method of playing a gaming device by a user. The method includes inserting a voucher having a redemption value into the gaming device. The user is queried for a credit value. The number of full and partial credits available to the player are calculated by the gaming device. The player is allowed to place wagers and play a game using credits as wagers The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

Gaming System

Figure 1:
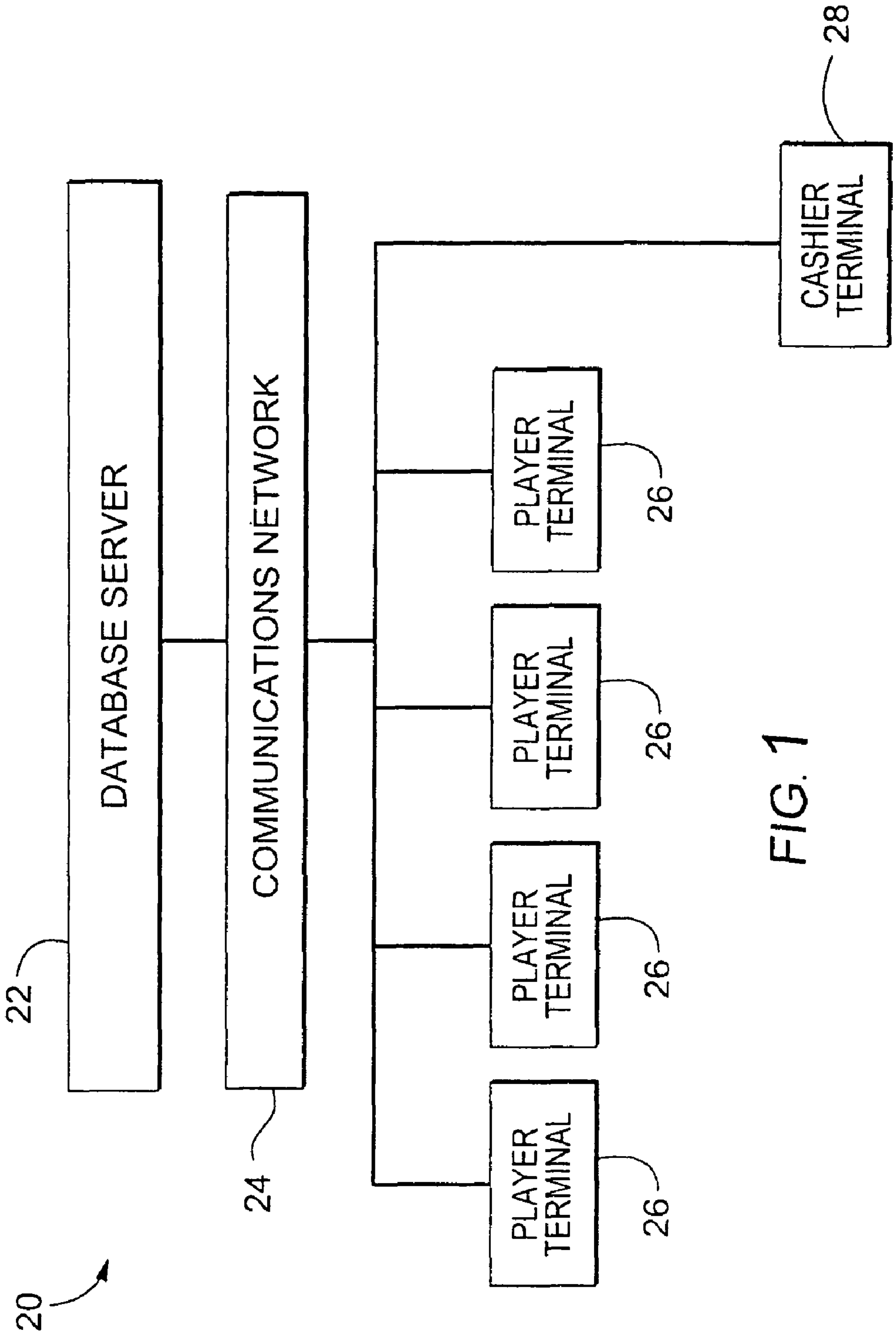
FIG. 1 is substantially a schematic view of a gaming system of the present invention.

Referring now to FIG. 1, the present invention comprises a gaming system generally indicated by reference number 20. Gaming system 20 comprises a database server 22, communications network 24, player terminals 26, and cashier terminal 28. Database server 22 is in communication with communication network 24 and stores a database of information. The database server may be a Compaq 1850R database server using the Windows NT operating system and the Microsoft SQL 7.0 database software. Communication network 24 may be a network using TCP/IP communication protocol. The player terminals 26 and cashier terminal 28 are interconnected with the communication network 24. During operation, the player terminals 26 are in communication with the database server 22 possibly communicating through intermediate networks or encryption devices in order to record transactions, verify records, and change game parameters.

Figure 2:
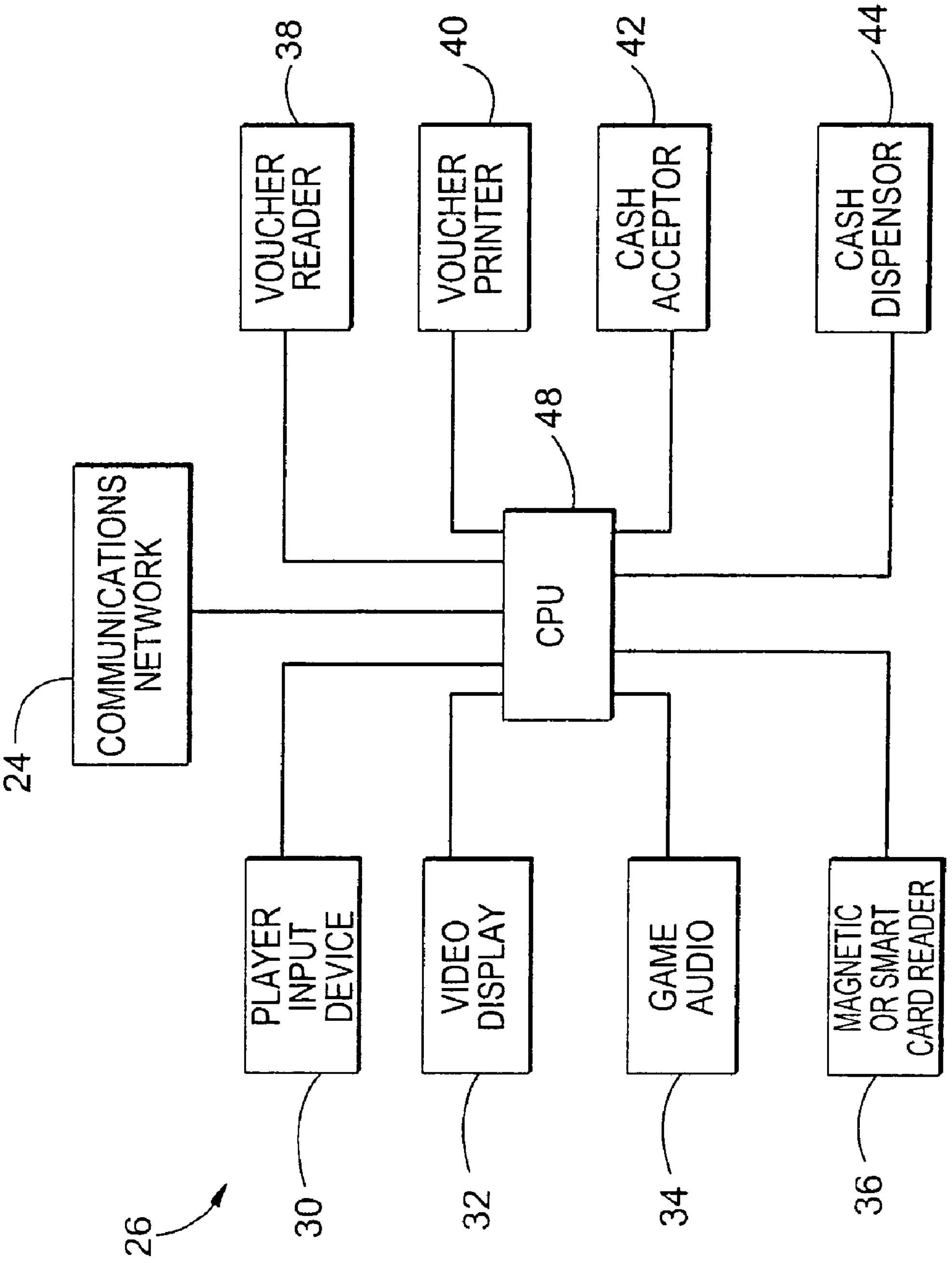
FIG. 2 is substantially a schematic view of a player terminal of the present invention.

Referring now to FIG. 2, player terminal 26 may comprise the following components: player input device 30, a video display 32, a audio device 34, a magnetic or smart card reader 36, a voucher reader 38, a voucher printer 40, a cash acceptor 42, and a cash dispenser 44, all of which are in communication with a central processing unit (CPU) 48. The CPU has a processor, input/output functions, and various memory capabilities, including non-volatile memory for critical data. The CPU 48 is in communication with the communications network 24. CPU 48 can be a conventional Intel x86 based processor or motherboard or CPU 48 may be a number of proprietary devices utilizing different processors, such as the Intel 80960. Video display 32 may be a Telco high resolution 19 inch display. Voucher reader 38 and cash acceptor 42 may be combined into a single device, such as model WBA 13SS, available from JCM in Las Vegas, Nev. The voucher printer 40 may be a Transact technologies series 700 thermal printer. The cash dispenser 44 may be produced by Akahi-Seiko. Player input device 30 may be buttons, a joystick, or other electrical and mechanical controls, including a touch screen. The construction of player terminal 26 is within the ability of one skilled in the art. Many of these components may be omitted, if desired.

Figure 3:
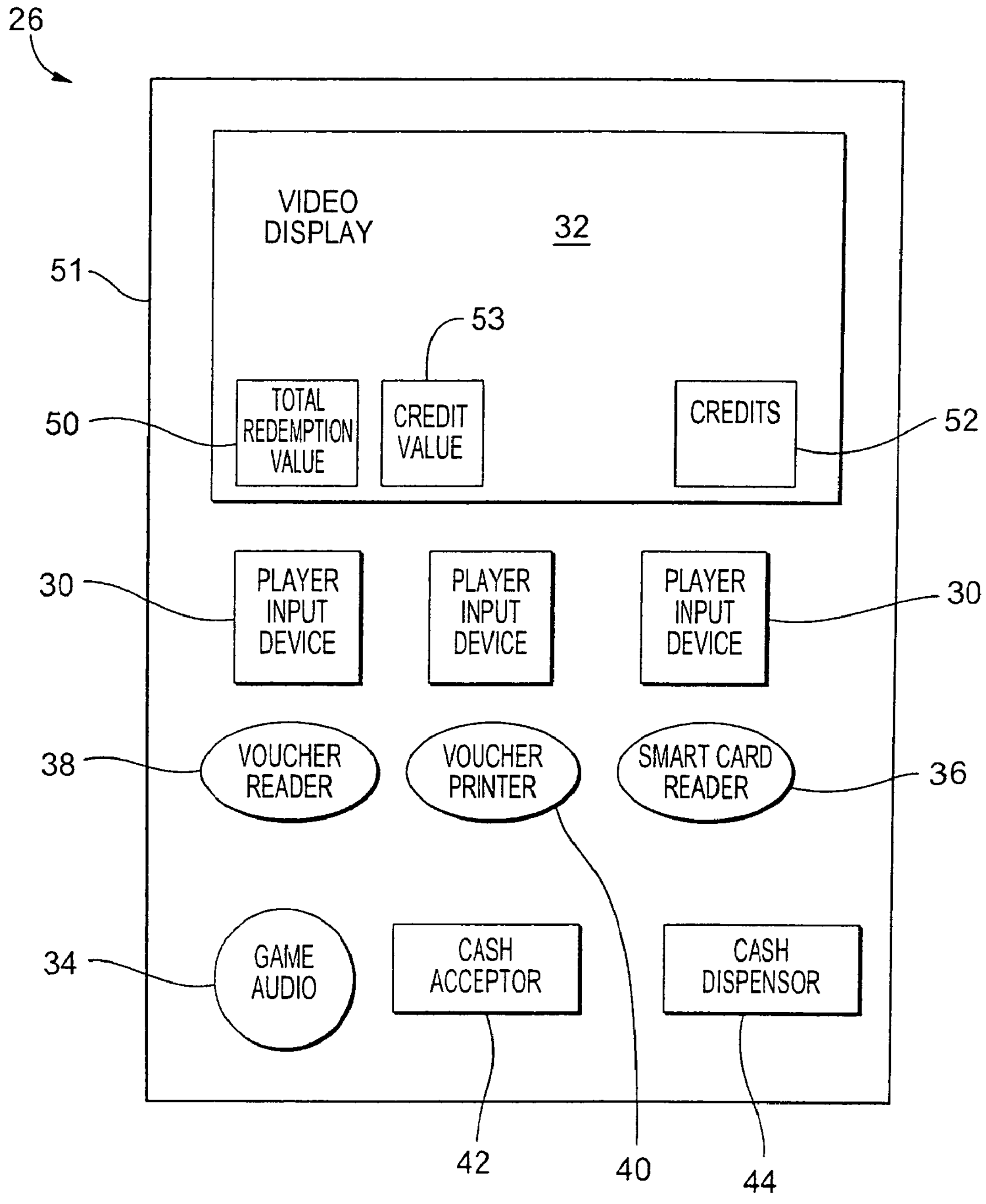
FIG. 3 is substantially a front view of a player terminal of the present invention.

Referring now to FIG. 3, a front view of the player terminal of the present invention is shown. Player terminal 26 comprises a player input device 30, a video display 32, a game audio or speaker 34, a magnetic or smart card reader 36, a voucher reader 38, a voucher printer 40, a cash acceptor 42, and a cash dispenser 44 all of which are mounted in a case or housing 51. Preferably, the components of player terminal 26 are mounted in case 51 in a manner that is ergonomically appealing to a user or game player.

Various meters may be provided for presenting numerical information to the player. These meters may be separate devices or they may be displayed in video display 32. In the preferred embodiment, video display 32 presents total redemption value 50, credit value 53, and number of credits 52. Total redemption value 50 is the total value the player currently has available for redemption. This is preferably displayed in units of the local currency. Credit value 53 is the value of a credit, which is also preferably displayed in units of local currency. As shall be discussed below, the present invention allows for different credit values to be selected. Number of credits 52 is the number of credits the player has available, which is derived by dividing total redemption value 50 by credit value 53. Number of credits 52 may include fractional credits, for example, 2.5 or 2½.

Game Initiation Flowchart

Figure 4:
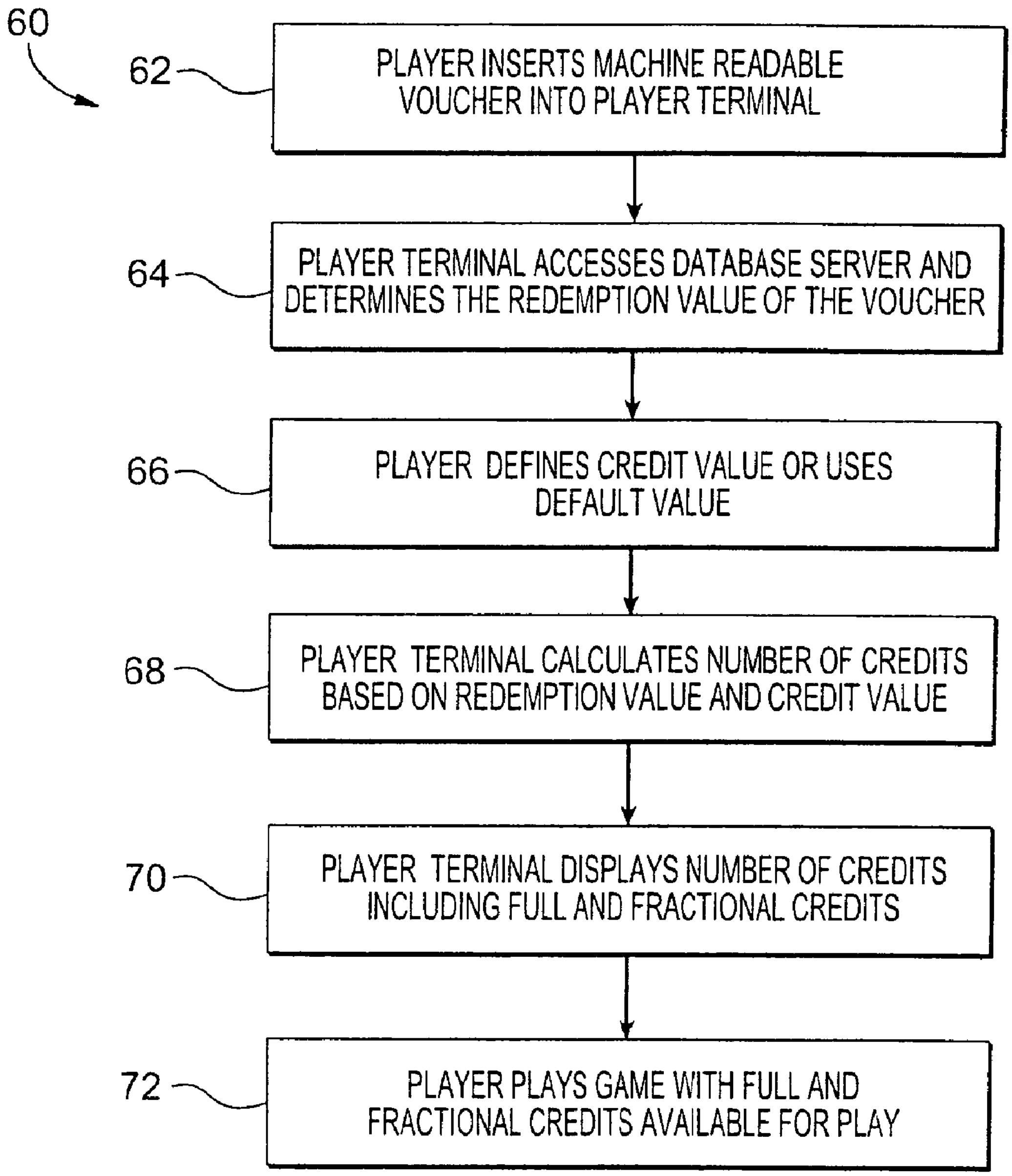
FIG. 4 is substantially a flowchart of the game initiation sequence of the present invention.

FIG. 4 shows one method by which the present invention may be operated. A player or user inserts a voucher (not shown) having a predetermined value into voucher reader 38 at step 62. The voucher bears information that is read by voucher reader 38. Voucher reader 38, player terminal 26, or database server 22 uses the information to derive the value. The information is typically a monetary value. However, the information may also comprise other information, such as the identity of the player, which would allow the player to access the player's account and used value in the account to play the game.

Player terminal 26 communicates with database server 22 to access the database stored thereon and retrieve data associated with the voucher. The database server verifies that the voucher is valid and determines its monetary value at step 64. Next, the player terminal may query the user, via video display 32 and/or audio 34, for a credit value at step 66. The user may input the credit value using one of the player input devices 30. Credit value 53 can be specified as any monetary value. For example, the credit value may be $0.0007 or $2.74. However, in the preferred embodiment, the system operator is able to determine a maximum and minimum credit value and valid increments in between. Thus the player may be allowed to select any voucher value between $0.05 and $100.00 in increments of $0.01. If no credit value is specified, a default value may be used.

From the total redemption value and the credit value, CPU 48 calculates the number of credits available for the player to play the game. Video display 32 may display total redemption value, credit value, and number of credits available in step 70. The game is now available for the player to play in step 72. It is noted that the game player has available both full credits and partial credits for game play at any time.

Game Flowchart

Figure 6:
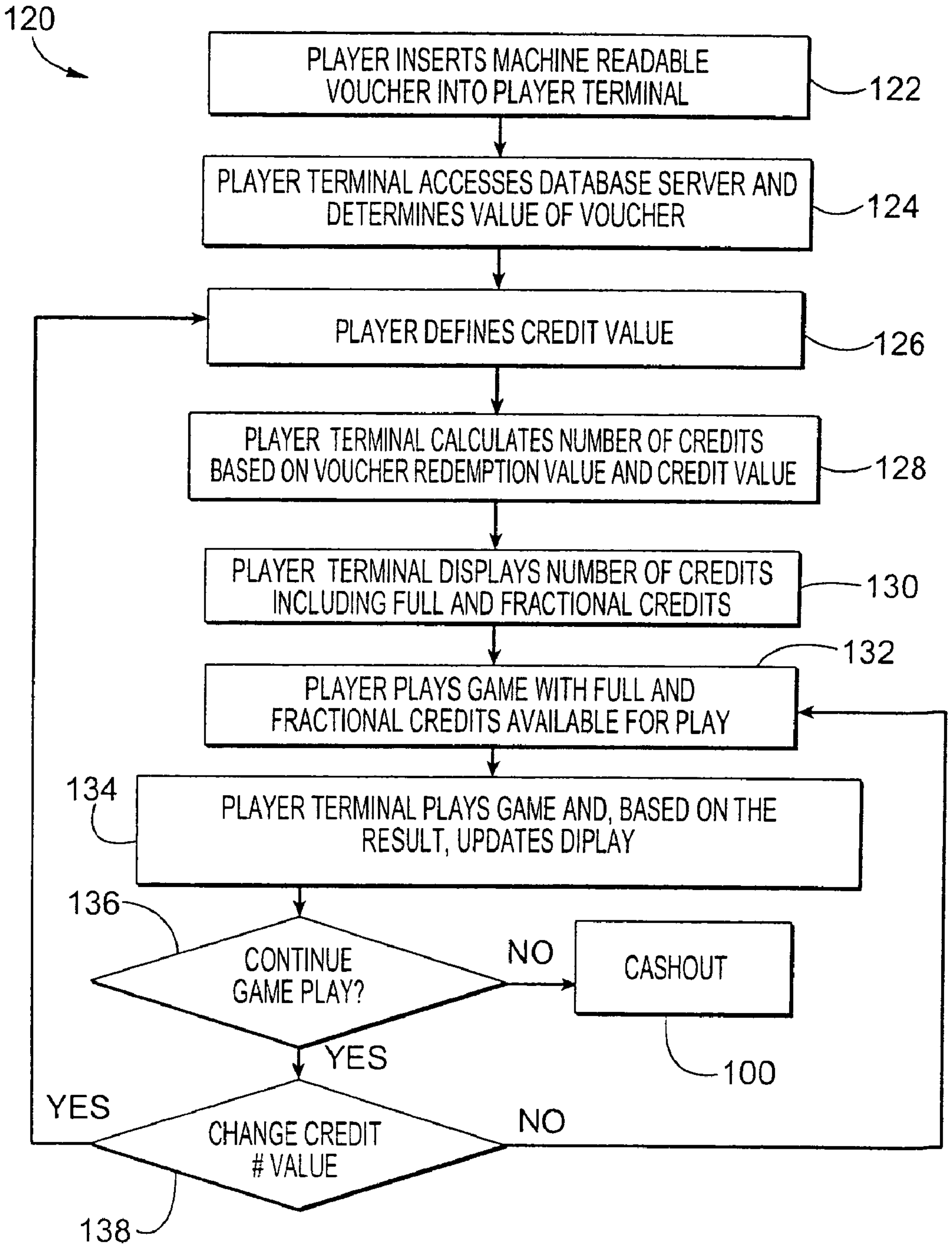
FIG. 6 is substantially a flowchart of a game sequence of the present invention.

Referring to FIG. 6, a flowchart of the preferred game sequence 120 in which the user selects the credit value of the present invention is shown. A game player or user initiates game play on player terminal 26 by inserting a voucher (not shown) into voucher reader 38 at step 122. The database server verifies that the voucher is a valid voucher and determines or confirms its monetary value at step 124. Next, the player terminal queries the user, via the video screen and/or audio, for a credit value at step 126. The user inputs the credit value using one of the player input devices 30. If no new denomination is specified a pre-existing or default value will be used. The CPU calculates full game credits and partial game credits based upon the voucher value and the user selected credit value at step 128. The video display displays the full game credits, the partial game credits, and redemption value at step 130. The game is now available for the player to play at step 132.

It is understood that the game player selects a wager in terms of a number of credits at step 132. The game user plays the game at step 132 resulting in a game event occurring. The game event generates new values for the number of game credits and the redemption. The credits and voucher value will increase, decrease, or stay the same depending upon the results of the game event. The values in display 32 are updated and game data may be recorded in the database at step 134. The display is updated with new full game credits, partial game credits and voucher value at step 134.

At decision step 136, the game player may elect to discontinue game play by a selection on the player input device 30. If the answer at step 136 is no, a cashout sequence 100 is initiated. The cashout sequence returns a voucher to the player with a value equal to the current redemption value. If the answer is yes, the game sequence continues to decision step 138 where the user has an option to change the credit value. Again, the user would use player input device 30 to select a new credit value. If the answer to decision 138 is yes, the game sequence loops back to step 126 where the user selects a credit value. If the answer to decision 138 is no, the game sequence loops back to step 132 where the game player plays the game again using the same credit value.

An example of a user playing a game on player terminal 26 using the method of sequence 120 is as follows:

1. The game player has a voucher having a value of $9.96.
2. The voucher is inserted into voucher reader 38.
3. The database server 22 verifies that the voucher is a valid voucher.
4. The game player is asked for a credit value and selects $0.05.
5. The user inputs the credit value in player terminal 26 using one of the player input devices 30.
6. The CPU 48 calculates full game credits and partial game credits based upon the voucher value and the user selected credit value.
7. The video display displays 199 full game credits, 1 partial game credit, and $9.96 total redemption value.
8. The player plays the game resulting in a game event occurring. Assume that the player wins $0.20, after subtracting the cost of play and adding a prize.
9. The new values are 203 full game credits, 1 partial game credit, and $10.16 total redemption value.
10. The new credits and voucher value are recorded in non-volatile memory and the display is updated with the new values.
11. The game player is given the opportunity to discontinue play.
12. Assuming that play continues, the game player may select a new credit value.
13. The game player selects a credit value of $0.25.
14. The CPU 48 calculates full game credits and partial game credits based upon the redemption value and the user selected credit value.
15. The video display is updated with 40 full game credits, 0.64 partial game credits, and $10.16 redemption value.
16. Play may then continue indefinitely.

Alternative Game Flowchart

Figure 5:
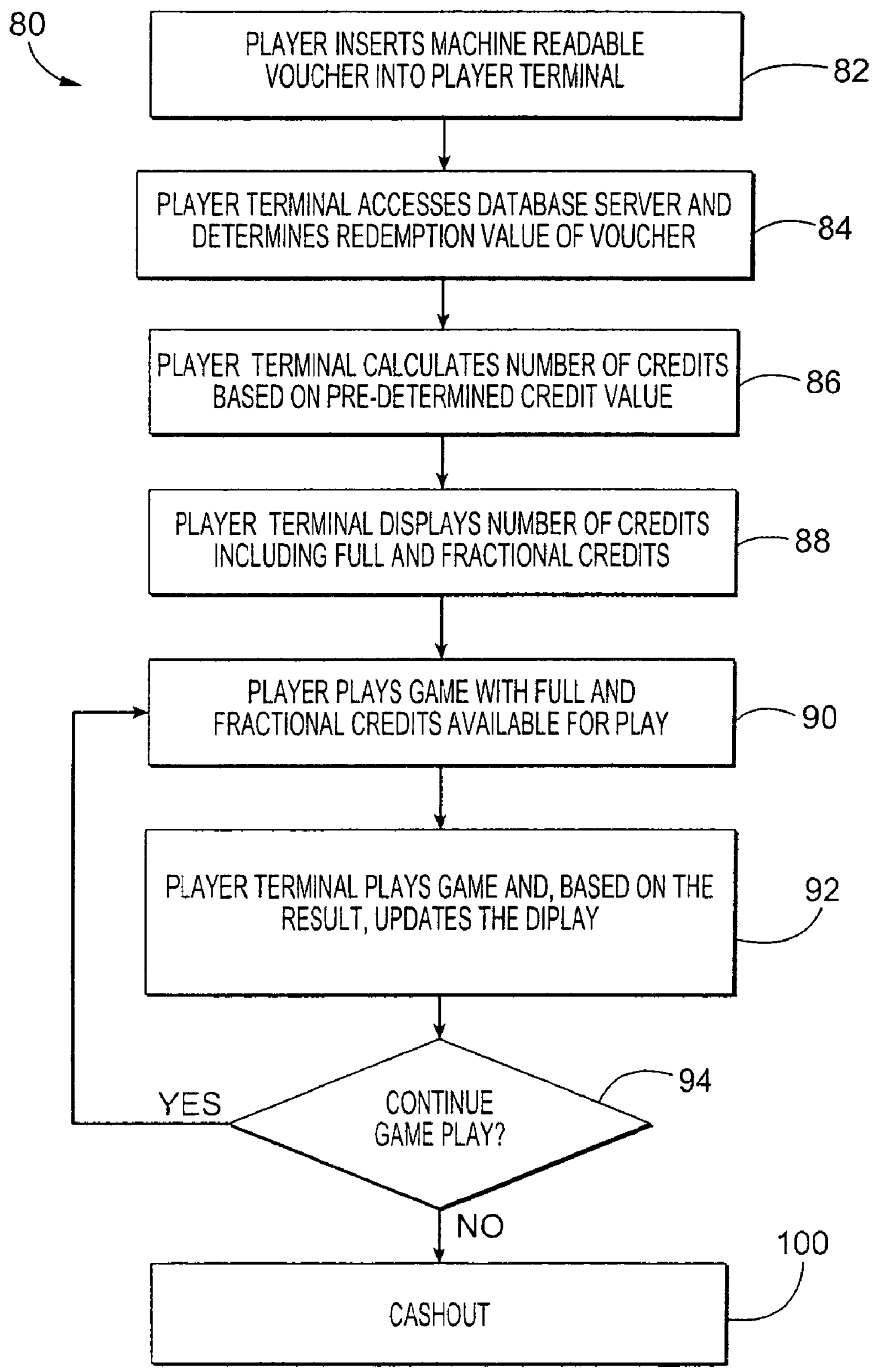
FIG. 5 is substantially a flowchart of another game sequence of the present invention.

Referring to FIG. 5, a flowchart of an alternative game sequence 80 of the present invention with a predetermined credit value is shown. A game player or user initiates game play on player terminal 26 by inserting a voucher (not shown) at step 82. The database server verifies that the voucher is a valid voucher and confirms or determines its monetary value at step 84. Next, the CPU 48 calculates full game credits and partial game credits based upon the redemption value and the pre-determined credit value at step 86. Video display 26 displays full game credits, partial game credits, and the redemption value at step 88. The game is now available for the player to play at step 90 in which the player selects a wager and plays a game.

At the conclusion of the game, player terminal 26 updates the display and may record data related to the game play at step 92. The number of credits and redemption value will increase, decrease, or stay the same depending upon the results of the game. At step 94, the game player may elect to discontinue game play by a selection on the player input device 30. If the answer is yes, the game sequence loops back to step 90 to play the game again, repeating steps 90, 92, and 94. If the answer at step 94 is no, a cashout sequence 100 is initiated. The cashout sequence may return a voucher equal to the current total redemption value to the player.

An example of a user playing a game on player terminal 26 using the method of sequence 80 is as follows:

1. The game player has a voucher having a value of $9.95.
2. The voucher is inserted into voucher reader 38.
3. The database server 22 verifies that the voucher is a valid voucher.

4. The CPU 48 calculates a full game credit and a partial game credit based upon the voucher value and the pre-determined credit value. Assume that the credit value is $0.25.
5. The video display displays 39 full game credits, 0.8 partial game credits, and $9.95 redemption value.
6. The player plays the game resulting in a game event occurring. Assume that the player wins $0.25.
7. The new values are 40 full game credits, 0.8 partial game credits, and $10.20 redemption value.
8. The new credits and voucher value are recorded to the database and the display is updated.
9. The game player is given the opportunity to continue or stop playing the game.
10. Assuming that play continues, the game is played again with the same pre-determined voucher value.

Cashout Flowchart

Figure 7:
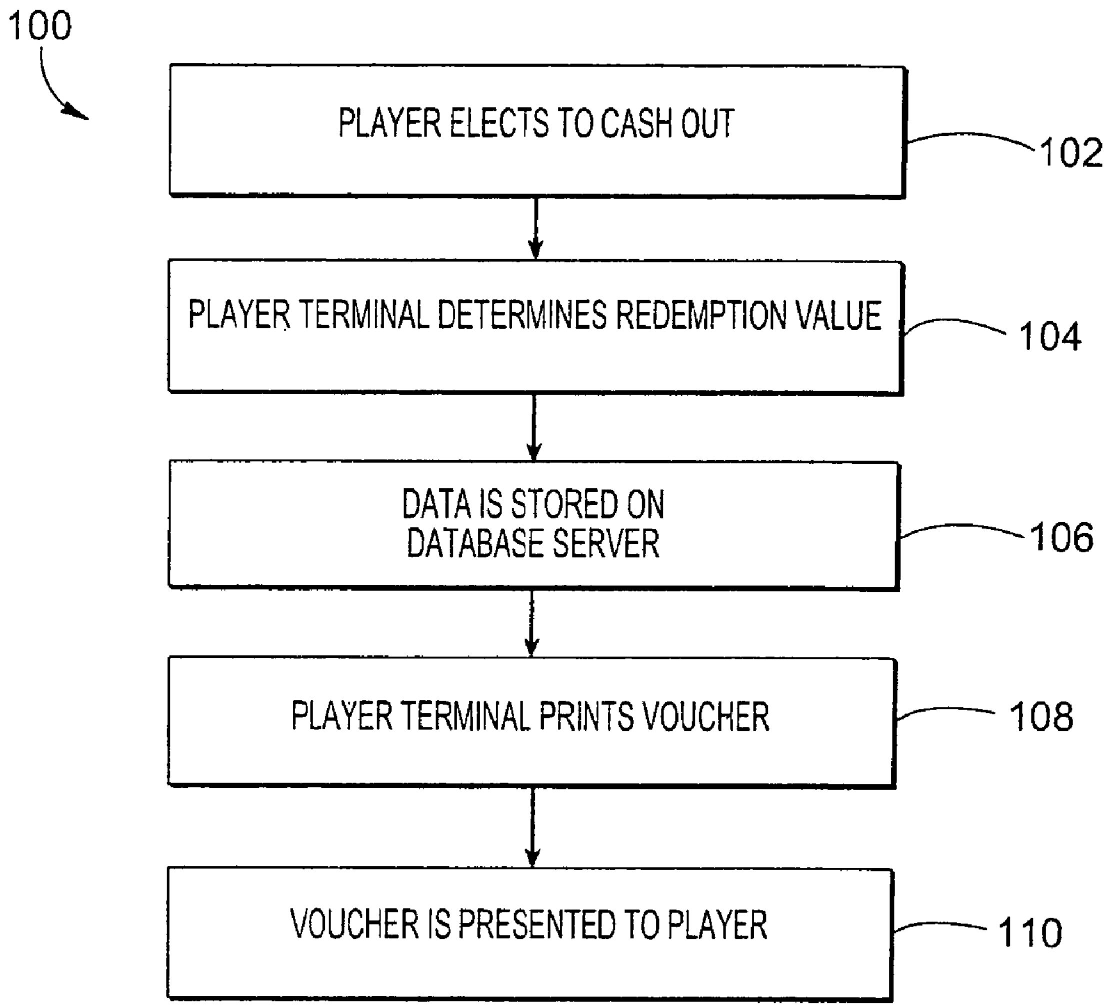
FIG. 7 is substantially a flowchart of the cashout sequence of the present invention.

FIG. 7 shows a flowchart of the cashout sequence 100. The cashout sequence begins at step 102 when the game player elects to cashout. The game player would use one of the player input devices 30 to elect to cashout. Next, the player terminal determines the redemption value by retrieving it from the non-volatile memory in step 104. The redemption value, is stored on the database in the database server 22 at step 106. Voucher printer 40 prints the voucher at step 108. Voucher printer 40 then issues the voucher to the user at step 110. The player may then take the voucher to a cashier terminal or an actual cashier to redeem the voucher.

It is noted that the partial or fractional game credits may be displayed on the credit meter 52 using a fixed point (decimal) or fractional representation. The credits whether represented as decimal or fractional values are visible to the player and available for game play. The game player could choose, for example, to wager or play 0.4 or 4/10 of a credit. For a $0.25 credit value, this would be a wager of $0.10. Therefore, the present invention allows fractional credits to be played.

All of the game player's credits may be wagered according the player's choice. The game player may wager credits with the present invention that were not previously available, such as $0.17, $0.0055 or $12.18. The player may also elect to "let it ride" and play all the credits allocated to the player. The gaming system and method of the present invention allows the player a more flexible way of playing a game that adds to the enjoyment and excitement of playing the game.

Pay tables for the game may be scaled according to a player's selected wager amount. Pay tables and awards may additionally be fixed or mapped according to the user selected base wagering denomination or the predetermined base wagering denomination thresholds or amounts, and may further be scaled within each wager threshold. If desired, prizes may be presented as a multiple of credits. For example, payouts could be presented as 1.5 times a credit value. This flexibility of payout possibilities allows a game designer to provide more interesting pay arrangements, particularly since the fractionally amounts won may be wagered.

The prior art systems typically reduce credits to the lowest common denominator, making statistical data gathering on user game play a problem. The present invention may record full credits, partial credits, redemption value, and credit value to the database. The game player may place multiple wagers at the value and the player may define different credit values. All of the associated data with these gaming activities may be recorded to the database. The determination of the success and popularity of differing denomination machines can be readily gathered and analyzed with the present invention.

First Alternative Game Initiation Flowchart

Figure 8:
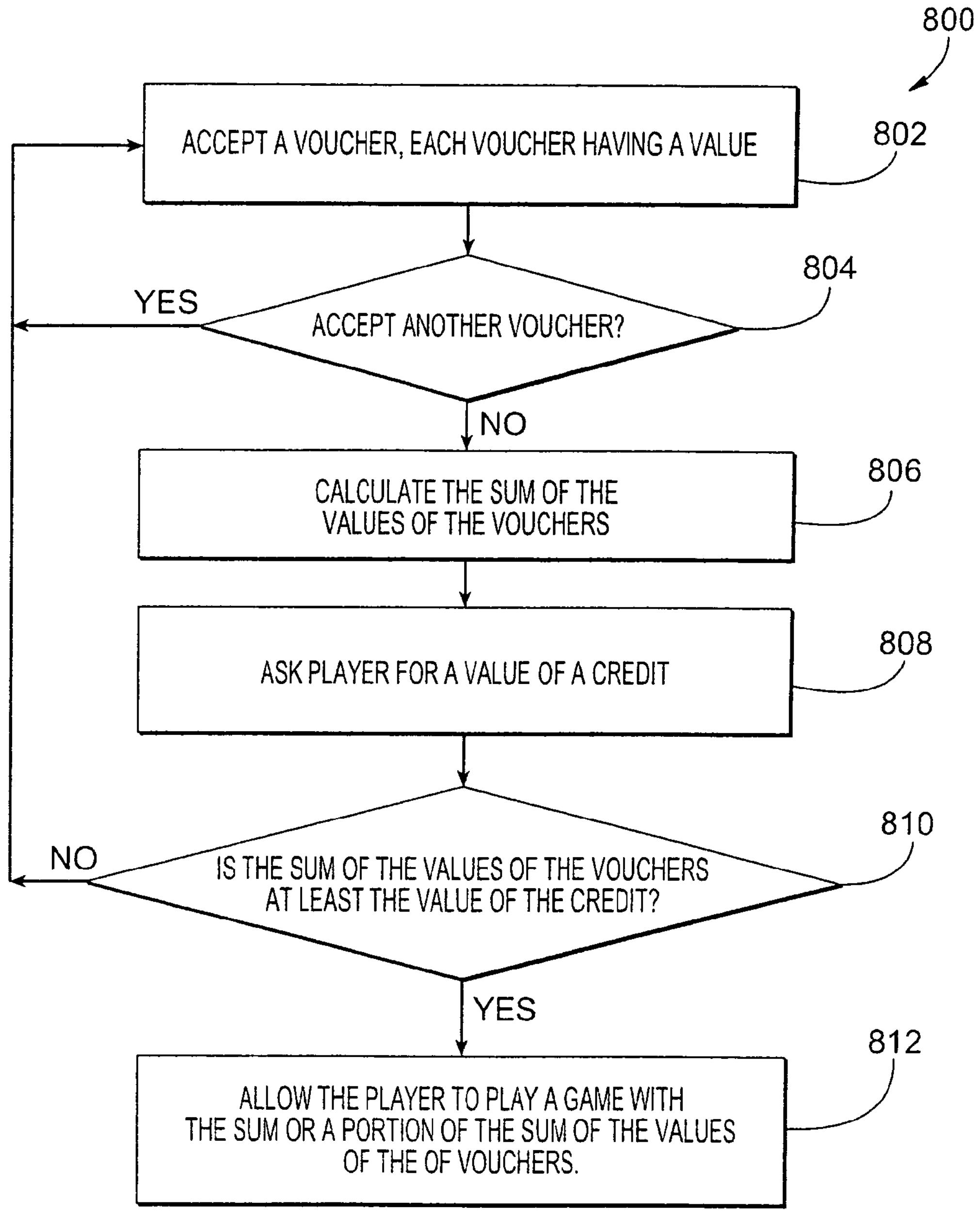
FIG. 8 is substantially a flowchart of another method of operation of the present invention.

FIG. 8 shows a flowchart of an alternative game initiation sequence 800. Sequence 800 begins at step 802 when the gaming device accepts a voucher. Each voucher has a value. Next, the player is allowed to provide additional vouchers at step 804. If the player provides another voucher, the sequence loops back to step 802. If not, the sum of the vouchers is calculated at step 806. The player is asked to input a credit value at step 808. At step 810, the game determines if the total value of the vouchers accepted is greater than the selected credit value. If the sum is greater than the credit value, the game continues to step 812. If the sum is less than the credit value, the game loops back to step 802 to accept another voucher. The game is played at step 812, where the player can play the game with the total sum or a portion of the sum of the voucher values.

Multiple Currency Operation

The present invention is adapted to operate with multiple currencies. A player may place a foreign currency into game terminal 26. In this event, the game terminal 26 may convert the currency into a domestic currency using an exchange rate. It would then determine the redemption value of the currency, the credit value, and the number of credits available to the player using the method discussed above. The player may then play the games as discussed above.

CONCLUSION

The present invention solves many of the problems associated with the prior art. The present invention provides a gaming system and method that allows game play with full credits, partial credits or both. The present invention provides a gaming system and method that allows a user to choose a base wagering denomination. The present invention provides a gaming system and method that records game events on a database in terms of full credits, partial credits and voucher value. The present invention eliminates the need for change vouchers in a gaming system.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

The invention claimed is:

1. A gaming system, comprising:

a communication network;

a plurality of player terminals, interconnected via the communications network, wherein at least one player terminal comprises:

a central processing unit (CPU);

a credit acceptor, coupled to the CPU, for receiving funds from a player for use on a gaming device;

a player input device, coupled to the CPU; and a video display, coupled to the CPU; wherein the CPU:

receives from the player input device a credit value selection from the player, wherein the value of each credit is a fractional denomination of standard currency denominations;

converts the funds received from the player via the credit acceptor into credits corresponding to the selected credit value;

controls the video display to display the credits on the gaming device to the player;

receives a player's wager, wherein the player wager comprises one or more of the credits; and presents a game of chance to the player in exchange for the player's wager.

2. The system of claim 1, wherein the credits are expressed as decimals.

3. The system of claim 1, wherein the credits are expressed as fractions.

4. The system of claim 1, further comprising the CPU setting a maximum credit value.

5. The system of claim 1, further comprising the CPU setting a minimum credit value.

6. The system of claim 1, further comprising the CPU setting an incremental rate by which the player can increase or decrease the credit value.

7. The system of claim 1, wherein the credit value is a fraction of $0.01.

8. The system of claim 1, wherein standard currency denominations are $0.01, $0.05, $0.10, $0.25, or $1.00.

9. A gaming system, comprising:

a communications network;

a plurality of gaming devices, interconnected via the communications network, the gaming devices comprising:

a central processing unit (CPU);

a credit acceptor, coupled to the CPU;

a player input device, coupled to the CPU;

a video display device, coupled to the CPU, wherein the CPU:

receives from the credit acceptor funds from the player for use on a gaming device;

receives from the player input device player input selecting a credit value that is less than a smallest denomination for standard currency;

determines a number of credits available for wagering based upon both the funds received from the player and the credit value selected by the player;

displays on the video display device the credits on the gaming device to the player;

receives from the player input device a player's wager, wherein the player's wager comprises one or more credits, and the player's wager does not have a total value equal to standard currency denominations; and presents on the video display device a game of chance to the player in exchange for the player's wager.

10. The gaming system of claim 9, further comprising the CPU setting a maximum credit value.

11. The gaming system of claim 9, further comprising the CPU setting a minimum credit value.

12. The gaming system of claim 9, further comprising the CPU scaling a pay table according to the credit value selected by the player.

13. The gaming system of claim 9, wherein the credit value is a fraction of $0.01.

14. The gaming system of claim 9, wherein the standard currency denominations are $0.01, $0.05, $0.10, $0.25, or $1.00.

* * * * *